(12) United States Patent
Yerram et al.

(10) Patent No.: US 11,578,621 B2
(45) Date of Patent: Feb. 14, 2023

(54) SYSTEM FOR COOLING TURBINE SHAFT COUPLING

(71) Applicant: GENERAL ELECTRIC COMPANY, Schenectady, NY (US)

(72) Inventors: Ravinder Yerram, Sugar Land, TX (US); Balakrishnan Ponnuraj, Sugar Land, TX (US); Vineet Sethi, Sugar Land, TX (US); Jose Emmanuel Guillen, Humble, TX (US); Tho Vankhanh Nguyen, Cypress, TX (US); Douglas Alan Jones, Bellaire, TX (US); Abhinash Reddy Konatham, Sugar Land, TX (US)

(73) Assignee: General Electric Company, Schenectady, NY (US)

( * ) Notice: Subject to any disclaimer, the term of this patent is extended or adjusted under 35 U.S.C. 154(b) by 72 days.

(21) Appl. No.: 16/843,848

(22) Filed: Apr. 8, 2020

(65) Prior Publication Data

US 2021/0317784 A1 Oct. 14, 2021

(51) Int. Cl.
*F01D 25/30* (2006.01)
*F01D 9/06* (2006.01)
*F02C 7/12* (2006.01)

(52) U.S. Cl.
CPC ............ *F01D 25/305* (2013.01); *F01D 9/06* (2013.01); *F01D 25/30* (2013.01); *F01D 9/065* (2013.01);
(Continued)

(58) Field of Classification Search
CPC ... F01D 25/305; F01D 25/30; F05D 2260/608
See application file for complete search history.

(56) References Cited

U.S. PATENT DOCUMENTS 3,985,181 A * 10/1976 Guillot .................... F02C 7/105
165/8
5,498,126 A * 3/1996 Pighetti .................. F01D 9/065
415/115

(Continued)

FOREIGN PATENT DOCUMENTS

EP 2330274 A1 6/2011
JP S59173527 10/1984

OTHER PUBLICATIONS

European Extended Search Report; EP Application No. 21164114.7; dated Oct. 4, 2021, 6 pgs.

*Primary Examiner* — Katheryn A Malatek
*Assistant Examiner* — Alyson Joan Harrington
(74) *Attorney, Agent, or Firm* — Fletcher Yoder, P.C.

(57) ABSTRACT

One or more cooling systems for ventilating a turbine and rotary shaft of a gas turbine system is provided. The gas turbine system includes a gas turbine engine and a turbine exhaust collector in separate enclosures. A first cooling system includes an educator that sucks exhaust gas through a diffuser and directs it out of the turbine exhaust collector enclosure based on suction pressure created from the high velocity of exhaust gas. A second cooling system include struts that enable the exhaust gas to flow from the diffusers to a ventilation flow stack. A third cooling system includes exhaust gas sucked from an opening to a top duct based on suction pressure created from the rotation of the rotary shaft disposed about a coupling. A guideway associated with the third cooling system also directs the exhaust gas to flow to the top duct. These cooling systems are designed to increase the efficiency of ventilating the turbine and rotary shaft, prevent misalignments of the rotary shaft, which may result in thermal stresses, and allow the use of the gas turbine systems in higher ambient temperature environments.

18 Claims, 8 Drawing Sheets

(52) U.S. Cl.
CPC ............ *F02C 7/12* (2013.01); *F05D 2240/60* (2013.01); *F05D 2260/608* (2013.01)

(56) References Cited

U.S. PATENT DOCUMENTS

| | | | |
|---|---|---|---|
| 6,092,360 | A | 7/2000 | Hoag et al. |
| 8,505,274 | B2 | 8/2013 | Satou et al. |
| 9,085,996 | B2 | 7/2015 | Ponnuraj et al. |
| 2007/0089421 | A1* | 4/2007 | Jangili ............... F01D 25/12 60/772 |
| 2012/0102910 | A1* | 5/2012 | Francisco ............ F01D 25/30 60/39.5 |
| 2012/0227371 | A1 | 9/2012 | Johnson et al. |
| 2013/0084172 | A1* | 4/2013 | Kasibhotla ............ F02C 7/12 415/182.1 |
| 2013/0139516 | A1* | 6/2013 | Viti ................... F02C 7/18 60/39.83 |
| 2015/0276247 | A1 | 10/2015 | Baten et al. |
| 2017/0234135 | A1* | 8/2017 | Takamura ............ F02C 7/18 415/116 |
| 2017/0342901 | A1 | 11/2017 | Scipio et al. |

\* cited by examiner

SYSTEM FOR COOLING TURBINE SHAFT COUPLING

BACKGROUND OF THE INVENTION

The subject matter disclosed herein relates to cooling a turbine shaft coupling of a gas turbine system, such as a turbine shaft coupling downstream of an exhaust outlet of a gas turbine system.

Gas turbine systems may be used in a variety of applications, such as power generation. For example, a gas turbine generator may include an electric generator driven by a gas turbine to generate electricity for a power grid or a local facility. Gas turbine systems generally include one or more shafts and associated couplings to connect with a load, such as the electric generator. In certain configurations, the shaft and coupling may be disposed downstream from an exhaust outlet, such that a considerable amount of heat transfer may occur from an exhaust gas to the shaft and coupling. Unfortunately, the heat transfer can lead to thermal expansion and stress at the coupling, which in turn can cause shaft misalignment and associated vibration. As a result, the heat transfer to the shaft and coupling can cause performance issues, maintenance problems, and downtime for the gas turbine system. Accordingly, a need exists for cooling the turbine shaft coupling.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine exhaust collector having a first enclosure with an exhaust inlet and an exhaust outlet, and a diffuser coupled to the exhaust inlet. The diffuser includes an inner diffuser wall disposed about a cavity having a rotary shaft, an outer diffuser wall disposed about the inner diffuser wall, and an exhaust flow path between the inner and outer diffuser walls. The turbine exhaust collector also includes a first cooling flow path extending through the cavity having the rotary shaft, wherein the first enclosure is separate from a second enclosure surrounding a gas turbine.

In a second embodiment, a system includes a turbine exhaust collector having a diffuser with an inner diffuser wall disposed about a cavity having a rotary shaft, an outer diffuser wall disposed about the inner diffuser wall, and an exhaust flow path between the inner and outer diffuser walls. The turbine exhaust collector also includes a duct extending through the cavity along the inner diffuser wall toward a turbine rear frame, wherein the rotary shaft is configured to couple to a turbine shaft extending through a bore in the turbine rear frame, wherein a first cooling flow path extends through the duct to guide a first cooling flow toward the turbine rear frame, and a leak flow between the turbine shaft and the turbine rear frame is configured to provide a suction to draw in the first cooling flow through the duct.

In a third embodiment, a system comprises a turbine exhaust collector. The turbine exhaust collector includes a diffuser having an inner diffuser wall disposed about a cavity having a rotary shaft, an outer diffuser wall disposed about the inner diffuser wall, and an exhaust flow path between the inner and outer diffuser walls. A rotation of the rotary shaft is configured to drive a first cooling flow along a first cooling flow path through the cavity.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The gas turbine generators may include a gas turbine engine enclosed within an enclosure and a turbine exhaust collector enclosed within another enclosure. In order to avoid the buildup of heat around a turbine shaft disposed within the gas turbine engine coupled to a rotary shaft disposed within the turbine exhaust collector, the gas turbine generators includes one or cooling systems to carry the heat away from the turbine and rotary shafts. Unfortunately, the designs of the ventilation systems may limit the use of the gas turbine generators to environments within certain ambient temperature ranges and increase the operating costs of the gas turbine generators. Furthermore, the ventilation systems may draw a considerable amount of power, and thus reduce the efficiency of the gas turbine generators.

The disclosed embodiments are directed to systems for ventilating and cooling a turbine shaft and coupling assembly disposed within a gas turbine system. The gas turbine system includes a gas turbine engine and a turbine exhaust collector, and the gas turbine system may be coupled to one or more air intake systems, a variable bleed valve (VBV) flow stack, a ventilation flow stack, and an exhaust flow stack. The turbine shaft disposed within the gas turbine engine enclosure is coupled to a turbine shaft and coupling assembly disposed within the turbine exhaust collector enclosure. The enclosures surrounding the gas turbine engine and the turbine exhaust collector may be separate. In order to avoid the buildup of heat around the turbine shaft and coupling assembly, one or more cooling systems may be disposed within the turbine exhaust collector enclosure. The one or more cooling systems in conjunction with a variable bleed valve (VBV) flow stack, ventilation flow stack, and exhaust flow stack may purge and ventilate heat and exhaust products associated with the turbine shaft and coupling assembly. In certain embodiments, the disclosed cooling systems use the ventilation flow in the gas turbine engine enclosure to suction the coolant flow out of the turbine exhaust collector enclosure, particularly out of a cavity having the turbine shaft and coupling assembly. In certain embodiments, the disclosed cooling systems use the exhaust flow in an exhaust diffuser of the exhaust collector to suction the coolant flow out of the cavity having the turbine shaft and coupling assembly. In certain embodiments, the disclosed cooling systems use the rotation of the turbine shaft and coupling assembly to help drive the coolant flow out of the cavity having the turbine shaft and coupling assembly. These cooling systems are designed to cool the turbine shaft and coupling assembly, thereby reducing the possibility of thermal expansion of the turbine shaft coupling assembly, reducing thermal stress, and reducing the possibility of misalignment of the shafts.

Figure 1:
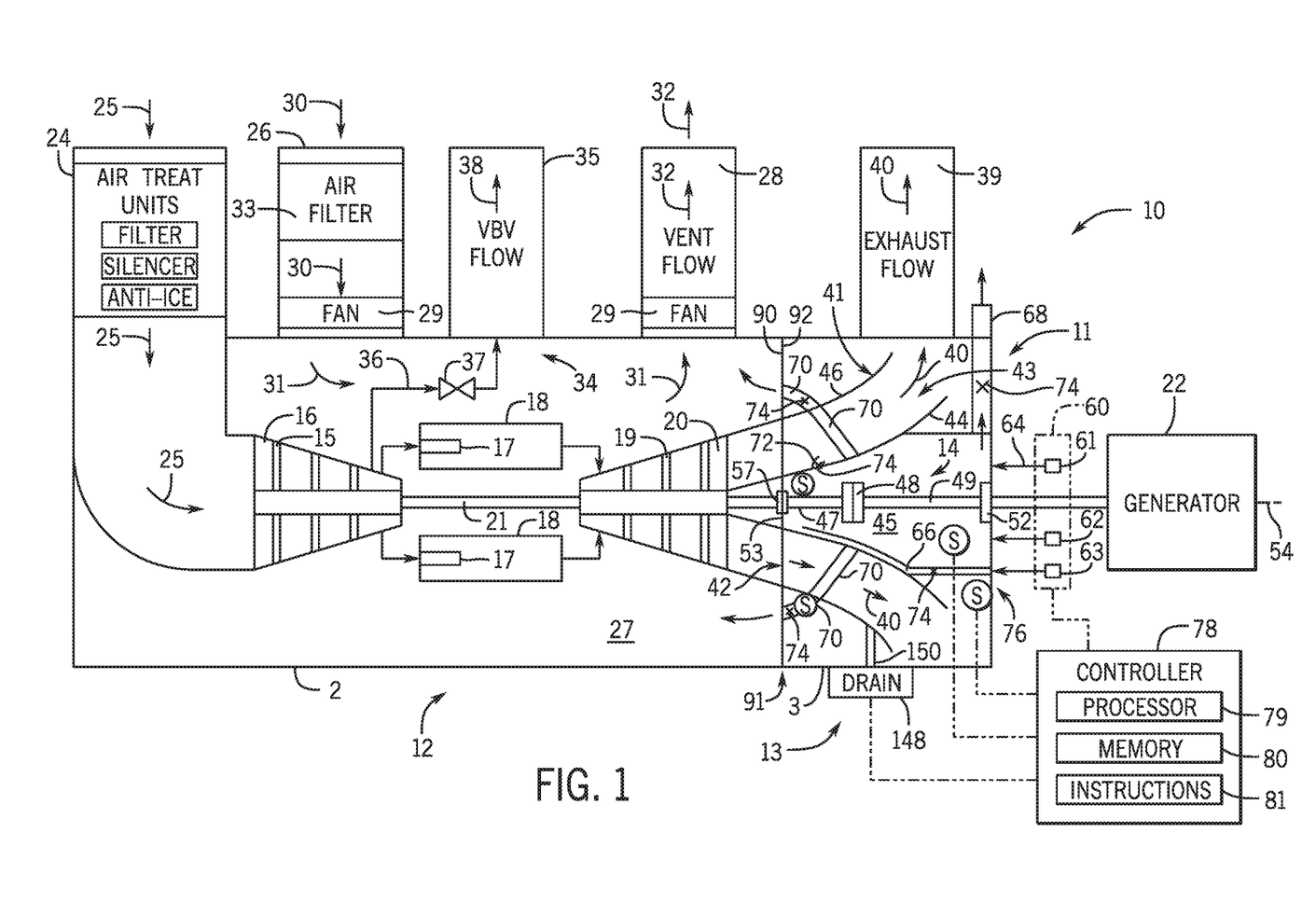
FIG. 1 is a schematic view of an embodiment of a gas turbine system, illustrating cooling systems configured to cool a turbine shaft and coupling assembly in an enclosure having an exhaust collector downstream from a turbine section.

FIG. 1 is a schematic block diagram of an embodiment of a gas turbine system 10 having a plurality of ventilation or cooling systems 11. The gas turbine system 10 includes a gas turbine engine 12, a turbine exhaust collector 13, an enclosure 2 (e.g., a turbine housing or room) disposed about the gas turbine engine 12, and an enclosure 3 (e.g., exhaust collector housing) disposed about the turbine exhaust collector 13. As discussed in detail below, the cooling systems 11 are configured to ventilate and cool a turbine shaft and coupling assembly 14 disposed inside the turbine exhaust collector 13 in the enclosure 3, thereby helping to help maintain a temperature of the turbine shaft and coupling assembly 14 below a threshold temperature while a hot exhaust gas flow passes through the turbine exhaust collector 13. The disclosed embodiments of the cooling systems 11 may be used individually or in any combination with one another.

The gas turbine engine 12 includes a compressor section having one or more compressors 16 (e.g., 1-30 compressor stages) each with a plurality of compressor blades 15, a combustor section having one or more combustors 18 (e.g., an annular combustor or multiple combustor cans) each with one or more fuel nozzles 17, and a turbine section having one or more turbines 20 (e.g., 1-30 turbine stages) each with a plurality of turbine blades 19. As illustrated, the turbine section 20 is drivingly coupled to the compressor section 16 with a shaft 21, and the turbine section 20 is drivingly coupled to a load (e.g., an electrical generator 22) via the turbine shaft and coupling assembly 14 extending through the enclosure 3 of the turbine exhaust collector 13. In operation, the compressor section 16 compresses air received from an engine air intake section (e.g., air intake duct or stack 23), supplies the compressed air and fuel through fuel nozzles 17 into the combustor section 18 for combustion to generate hot combustion gases, and then flows the hot combustion gases through the turbine section 20 such that the turbine blades 19 drive rotation of the shaft 21 and the turbine shaft and coupling assembly 14. The hot combustion gases are then exhausted from the gas turbine system 10 through the exhaust collector 13 and a combustion exhaust section (e.g., combustion exhaust duct or stack 39). As discussed in further detail below, a certain amount of leakage flow (e.g., hot combustion gases, heated air, heated lubricant, etc.) may pass into the enclosure 3, particularly inside the exhaust collector 13 in close proximity to the turbine shaft and coupling assembly 14. Additionally, a certain amount of heat may transfer through the walls of the enclosure 3 and/or the walls of the exhaust collector 13 into an interior of the exhaust collector 13 in close proximity to the turbine shaft and coupling assembly 14. The disclosed embodiments of the cooling systems 11 are configured to help ventilate and cool the turbine shaft and coupling assembly 14 in view of this leakage flow and heat transfer.

The gas turbine system 10 includes a plurality of intake and exhaust systems coupled to the enclosures 2 and 3. For example, the gas turbine system 10 includes the engine air intake section (e.g., the air intake duct or stack 23) coupled to and extending inwardly into the enclosure 2, and coupling to an intake of the compressor section 16. The air intake duct 23 may include one or more air treatment units 24 (e.g., air filters, silencer baffles, anti-icing systems, etc.) disposed along an air flow path of intake air flow passing through the air intake duct 23 and into the compressor section 16, as indicated by arrows 25.

The gas turbine system 10 also includes a ventilation air intake section (e.g., ventilation air intake duct or stack 26) and a separate ventilation air exhaust section (e.g., ventilation air exhaust duct or stack 28) coupled to the enclosure 2 and fluidly coupled to an interior volume or chamber 27 surrounding the gas turbine engine 12. In certain embodiments, the ventilation air intake duct 26 and/or the ventilation air exhaust duct 28 include one or more fans 29 (e.g., electric motor having a plurality of protruding fan blades) configured to force a ventilation air flow inwardly through the duct 26 along an intake flow path as indicated by arrows 30, through the chamber 27 surrounding the gas turbine engine 12 along a cooling flow path as indicated by arrows 31, and outwardly through the duct 28 along an exhaust flow path as indicated by arrows 32, thereby helping to remove any heat surrounding the gas turbine engine 12 to avoid heat buildup and control the temperature of the gas turbine engine 12. The ventilation air intake duct 26 also includes one or more air treatment units, such as air filters 33.

The gas turbine system 10 further includes a compressor bleed system 34 coupled to the compressor section 16 and a compressor bleed exhaust section (e.g., compressor bleed exhaust duct or stack 35). For example, in the illustrated embodiment, a compressor bleed line or conduit 36 extends from at least one compressor stage of the compressor section 16 to the compressor bleed exhaust duct 35, wherein the conduit 36 includes a variable bleed valve (VBV) 37 configured to vary a bleed flow of the compressor air extracted from the compressor section 16 and exhausted through the duct 35 as illustrated by arrow 38. The VBV 37 is configured to help control the gas turbine engine 12 by bleeding compressed air from the compressor section 16, and thus the amount of bleed flow may vary depending on various operating conditions of the gas turbine engine 12.

The gas turbine system 10 further includes the combustion exhaust section (e.g., combustion exhaust duct or stack 39), which is configured to discharge an exhaust flow of combustion gases generated in the combustion section 18 of the gas turbine engine 12. In the illustrated embodiment, the combustion exhaust stack 39 is coupled to the enclosure 3 above the turbine exhaust collector 13. In particular, the combustion exhaust stack 39 is fluidly coupled to an exhaust flow path 40 through the turbine exhaust collector 13, which is fluidly coupled to the turbine section 20.

The turbine exhaust collector 13 includes a diffuser 41 at least partially defining the exhaust flow path 40 from an exhaust inlet 42 of the enclosure 3 to an exhaust outlet 43 of the enclosure 3. The exhaust inlet 42 is coupled to an exhaust discharge opening of the turbine section 20, and the exhaust outlet 43 is coupled to the combustion exhaust stack 39. In the illustrated embodiment, the diffuser 41 is coupled to the exhaust inlet 42 via an inner diffuser wall 44 and an outer diffuser wall 46. The inner diffuser wall 44 is disposed about (e.g., extending circumferentially around) a cavity 45 having the turbine shaft and coupling assembly 14 (e.g., a rotary shaft). The outer diffuser wall 46 is disposed about (e.g., extending circumferentially around) the inner diffuser wall 44 at a radial offset from the inner diffuser wall 44. The exhaust flow path 40 is disposed between the inner and outer diffuser walls 44 and 46. For example, the exhaust flow path 40 may extend circumferentially around the inner diffuser wall 44. The inner and outer diffuser walls 44 and 46 may be at least partially or entirely annular walls (e.g., concentric annular walls), which gradually diverge away from a central axis 54 along the turbine shaft and coupling assembly 14 in a downstream flow direction as indicated by arrow 40. For example, the inner and outer diffuser walls 44 and 46 may diverge from the central axis 54 in a linear manner or a non-linear manner (e.g., following a curved path), such that the inner and outer diffuser walls 44 and 46 may include conical wall portions and/or curved annular wall portions. In addition to diverging from the central axis 54, the inner and outer diffuser walls 44 and 46 may diverge from one another in the downstream direction as indicated by arrow 40, such that an offset distance (e.g., radial distance) between the inner and outer diffuser walls 44 and 46 increases in the downstream direction. In this manner, the combustion gases flowing along the exhaust flow path 40 gradually expand or diffuse before entering the combustion exhaust stack 39.

As noted above, the turbine shaft and coupling assembly 14 is disposed inside the cavity 45 within the inner diffuser wall 44 of the diffuser 41. The turbine shaft and coupling assembly 14 may include a coupling 48 between a first shaft or turbine shaft portion 47 and a second shaft or generator shaft portion 49. The turbine shaft and coupling assembly 14 also may include a plurality of bearings 50, such as bearings 51 along the first shaft 47 and bearings 52 along the second shaft 49. The bearings 51 may be disposed at a turbine rear frame (TRF) section or wall 53, which is disposed at an upstream portion of the cavity 45 closest to the turbine section 20. The TRF wall 53 is coupled to the inner diffuser wall 44, such that the TRF wall 53 and the inner diffuser wall 44 generally block combustion gases from entering the cavity 44. However, a certain amount of leakage flow may pass through the TRF wall 53, particularly at the bearings 51, and into the cavity 44 that houses the turbine shaft and coupling assembly 14. The cooling systems 11 are configured to help ventilate and cool the turbine shaft and coupling assembly 14, and thus the cooling systems 11 may include a variety of cooling features for use individually or in combination with one another.

The cooling systems 11 may include an air supply system 60 having one or more fans 61 (e.g., electric motor driven fan blades), flow regulators 62 (e.g., valves), and/or air treatment units 63 (e.g., air filters). The air supply system 60 is configured to control an air flow (or other coolant flow) into the cavity 45 as indicated by arrows 64. Alternatively or additionally, the air supply system 60 may be configured to control the air flow out of the cavity 45 in a direction opposite from arrows 64. The cooling systems 11 also may include one or more baffles or conduits to control a flow into or out of the cavity 45. For example, the cooling systems 11 may include one or more intake flow conduits 65, 66 extending through the enclosure 3 into the cavity 45, one or more discharge flow conduits 68 extending out of the cavity 45 and through the enclosure 3 to an outside environment, one or more discharge flow conduits 70 extending from the cavity 45 through the diffuser 41 from the enclosure 3 to the interior chamber 27 of the enclosure 2 (i.e., into the cooling flow path 31), and/or one or more discharge flow conduits 72 extending out of the cavity 66 and through the inner diffuser wall 44 into the exhaust flow path 40. These conduits 65, 66, 68, 70, and 72 may be used in various combinations to define cooling flow paths through the cavity 45.

For example, in certain embodiments, one or more conduits 66 may supply a cooling flow (e.g., cooling air flow) into the cavity 45, and then one or more conduits 68 may discharge the cooling flow out of the cavity 45 directly to the outside environment. The one or more conduits 66 may route the cooling flow into close proximity with the bearings 51, the TRF wall 53, and the leakage flow at the bearings 51 and TRF wall 53. Thus, the one or more conduits 66 may focus the cooling flow onto the hot spot in the cavity 45. In certain embodiments, the one or more conduits 65 and/or 66 may supply a cooling flow (e.g., cooling air flow) into the cavity 45, the one or more conduits 70 may discharge the cooling flow out of the cavity 45 through the diffuser 41 into the interior chamber 27 of the enclosure 2, and then the ventilation air exhaust duct 28 may discharge the cooling flow out of the enclosure 2 in combination with the ventilation flow passing through the enclosure 2. As discussed in further detail below, each of the one or more conduits 70 may be coupled to or integrated with a strut extending between the inner and outer diffuser walls 44 and 46 of the diffuser 41. In certain embodiments, the one or more conduits 65 and/or 66 may supply a cooling flow (e.g., cooling air flow) into the cavity 45, and the one or more conduits 72 may discharge the cooling flow out of the cavity 45 and into the exhaust flow path 40 between the inner and outer diffuser walls 44 and 46 of the diffuser 41. For example, the exhaust flow path 40 may suction or draw the cooling flow out of the cavity 45 through the one or more conduits 72, and thus each one of the conduits 72 may be defined as an eductor. Alternatively or additionally, the air supply system 60 may use the fans 61 to push or force the cooling flow into the cavity 45 and out through the conduits 72 into the exhaust flow path 40. As discussed in further detail below, the conduits 70 may turn or bend in a downstream direction of exhaust flow along the exhaust flow path 40, thereby helping to create a suction to draw the cooling flow into the exhaust flow path 40 and/or to block a reverse flow of the exhaust gas into the cavity 45. These cooling flow paths defined by the conduits 65, 66, 68, 70, and 72 may represent individual cooling systems 11 and/or an integrated cooling system.

The cooling systems 11 also may be configured to selectively control cooling flows along cooling flow paths through the conduits 65, 66, 68, 70, and 72. Accordingly, in certain embodiments, each of the illustrated conduits 65, 66, 68, 70, and 72 may include a flow regulator 74 (e.g., a valve) configured to selectively control (e.g., partially or entirely open or close) the flow rate of coolant (e.g., ventilation or cooling air) into and/or out of the cavity 45 to help control the temperature within the cavity 45. The cooling systems 11 also may include a plurality of sensors 76, individually designated as S, in the conduits 65, 66, 68, 70, and 72 and the cavity 45. The sensors 76 are configured to monitor the temperature in the cavity 45 and/or the temperature of the turbine shaft and coupling assembly 14, thereby helping to control the cooling flows to maintain the temperature of the cavity 45 and/or the turbine shaft and coupling assembly 14 at or below a threshold temperature. The sensors 76 also may monitor other operational parameters, such as a flow rate of the cooling flow, a pressure in the cavity 45 and/or the conduits 65, 66, 68, 70, and 72, vibration or acoustic noise associated with the turbine shaft and coupling assembly 14, and thermal expansion or contraction of the components (e.g., turbine shaft and coupling assembly 14, enclosure 3, exhaust collector 13, etc.). The cooling systems 11 also may include a controller 78 coupled to the air supply system 60, the flow regulators 74, the fans 29, and the sensors 76.

The controller 78 may include one or more processors 79, memory 80, and instructions 91 stored on the memory 80 and executable by the processors 79 to perform various monitoring functions with the sensors 76 and control functions with the cooling systems 11 and the gas turbine system 11. The processors 79 may include one or more microprocessors, one or more "general-purpose" microprocessors, one or more special-purpose microprocessors, and/or one or more application specific integrated circuits (ASICS), or some combination thereof. For example, the processor 66 may include one or more reduced instruction set (RISC) processors. The memory 80 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof). The instructions 81 stored on the memory 80 include machine-readable and/or processor-executable instructions (e.g., firmware or software) for execution by the processors 79. The controller 78 also may include an analog to digital (A/D) converter, input/output circuitry, data processing circuitry, monitoring circuitry, and control circuitry. The controller 78 also may include components for operator interaction with the systems, such as display panels and/or input/output devices for checking operating parameters, inputting control signals representative of set points and desired operating parameters, checking error logs and historical operations, and so forth.

In operation, in response to feedback from the sensors 76, the controller 78 may be configured to adjust the air supply system 60, the flow regulators 74, and/or the fans 29 to change (i.e., increase or decrease) the flowrate and/or temperature of the cooling flow passing through the cavity 45 to ventilate and cool the turbine shaft and coupling assembly 14. In certain embodiments, the controller 78 may be configured to control the cooling systems 11 to provide cooling flows along cooling flow paths through only one, all, or any number therebetween, of the conduits 65, 66, 68, 70, and 72. The controller 78 may be configured to control the cooling systems 11 based on feedback from the sensors 76, historical data and trends in operating parameters (e.g., temperature, pressure, flow rate, vibration or noise, etc.) within the cavity 45, lookup tables correlating the monitored sensor data with various control functions (e.g., target flow rates through each of the conduits 66, 68, 70, 72, target fan speeds of the fans 29 and 61, target positions of the flow regulators 74, etc.), and computer models correlating the monitored sensor data with the control functions. The controller 78 also may be configured to control the cooling systems 11 based on upper and lower thresholds for operating parameters (e.g., temperature, pressure, flow rate, vibration or noise, etc.) in the cavity 45. The controller 78 also may be configured to control the cooling systems 11 based on a variety of factors, such as gas turbine engine operation, ambient temperature, and relative humidity in the surrounding environment (i.e., outside of the gas turbine system 10).

Figure 2:
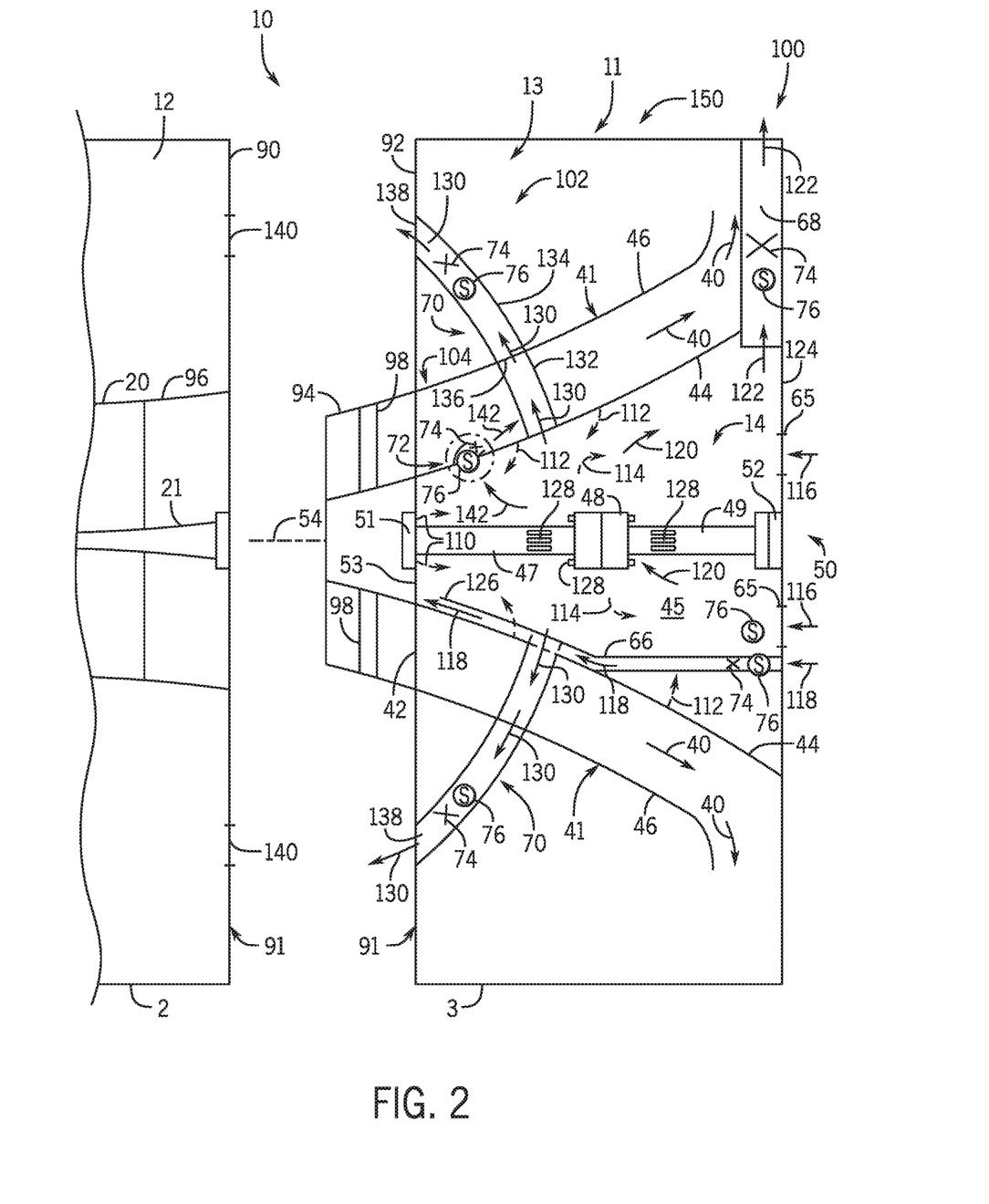
FIG. 2 is a schematic view of an embodiment of the one or more cooling systems in the enclosure having the exhaust collector.

FIG. 2 is a schematic side view of an embodiment of the gas turbine system 10 of FIG. 1, illustrating the enclosure 2 having the gas turbine engine 12 exploded from the enclosure 3 having the exhaust collector 13. As illustrated, the enclosures 2 and 3 are separate from one another, such that a side wall 90 of the enclosure 2 faces a side wall 92 of the enclosure 3. When the gas turbine system 10 is fully assembled as illustrated in FIG. 1, the side walls 90 and 92 are disposed against one another (or at least in close proximity to one another) at an interface 91. In certain embodiments, an upstream diffuser portion 94 may protrude from the side wall 92 of the enclosure 3, and a diffuser recess 96 may extend into the side wall 90 of the enclosure 2 adjacent the turbine section 20. The upstream diffuser portion 94 may include a plurality of support struts 98 extending between the inner and outer diffuser walls 44 and 46 at an upstream position relative to the conduits 70. When fully assembled as illustrated in FIG. 1, the upstream diffuser portion 94 extends into the diffuser recess 96 adjacent the turbine section 20. However, other embodiments of the gas turbine system 10 may not include the upstream diffuser portion 94 and the diffuser recess 96 as illustrated in FIG. 2.

As discussed above with reference to FIG. 1, the gas turbine system 10 includes one or more cooling systems 11, which may be independent or integrated with one another. For example, the cooling systems 11 may include a cooling system 100 including at least the one or more intake flow conduits 65 and/or 66 and the one or more discharge flow conduits 68, a cooling system 102 including at least the one or more intake flow conduits 65 and/or 66 and the one or more discharge flow conduits 70, a cooling system 104 including at least the one or more intake flow conduits 65 and/or 66 and the one or more discharge flow conduits 72. These cooling systems 100, 102, and 104 may be used alone or in combination with one another as parts of the cooling system 11. The cooling systems 11 (e.g., 100, 102, and/or 104) are configured to ventilate and/or cool the cavity 45 and the turbine shaft and coupling assembly 14.

Sources of heat within the gas turbine system 10 may be associated with heat transferred via a turbine rear frame (TRF) leakage (e.g., at TRF wall 53), heat transferred from the exhaust gas, heat transferred from the turbine shaft and coupling assembly 14 coupled to the shaft 21, and any combination thereof. A TRF leakage 110 near the TRF wall 53 may transfer heat into the cavity 45. The TRF leakage 110 may include a heated fluid leakage, such as a heated gas leakage (e.g., heated air, hot exhaust gas, etc.) and/or a heated liquid leakage (e.g., a heated lubricant), or a heat transfer through the TRF wall 53. Along with the TRF leakage 110, the exhaust gas along the exhaust flow path 40 may transfer heat through the inner diffuser wall 44 into the cavity 45 as indicated by arrows 112, and heat in the turbine shaft and coupling assembly 14 may transfer into the cavity 45 as indicated by arrows 114. Accordingly, the TRF leakage 110, the heat transfer 112, and the heat transfer 114 each contribute to the build-up of heat within the cavity 45. In order to ventilate or cool the cavity 45 and the turbine shaft and coupling assembly 14, one or more cooling systems 11 (e.g., 100, 102, and/or 104) circulate a coolant flow through the cavity 45.

As mentioned above, the turbine shaft and coupling assembly 14 is coupled to the shaft 21 of the gas turbine engine 12 and the shaft of the generator 22, and bearings 50 (e.g., bearings 51 and 52) provide rotational support for the shafts 47 and 49 of the turbine shaft and coupling assembly 14. The bearings 51 may include ball bearings, roller bearings, performed sleeve bearings, slipper bearings, and any combination thereof. The bearing 51 may be configured to absorb axial or radial loads. The bearings 51 may include one or more seals (e.g., elastomeric and/or metal seal rings) within their housings to block fluid leakage (e.g., gas and/or liquid leakage) along the respective shafts, e.g., shafts 47 and 49 of the turbine shaft and coupling assembly 14. However, some leakage may occur at the bearings 51, such as the TRF leakage 110 as discussed above. Unfortunately, the leakage (e.g., TRF leakage 110) also may transfer heat into the cavity 45. The cooling systems 11 (e.g., 100, 102, and/or 104) are configured to help alleviate the heat transfer associated with this leakage by ventilating and cooling the cavity 45.

For example, the cooling system 100 is configured to push or pull a coolant flow (e.g., ventilation or cooling air) along a cooling flow path through one or more intake flow conduits 65 and/or 66 into the cavity 45 as indicated by arrows 116 and 118, through the cavity 45 to ventilate the cavity 45 and cool any hots spots (e.g., the turbine shaft coupling assembly 14 and TRF wall 53) as indicated by arrows 120, and out of the cavity 45 through one or more discharge flow conduits 68 as indicated by arrows 122. In certain embodiments, the cooling system 100 include only one or more intake flow conduits 65, only one or more intake flow conduits 66, or a combination of both of the intake flow conduits 65 and 66. The intake flow conduits 65 (e.g., openings and/or tubes) are disposed in a sidewall 124 of the enclosure 3. The intake flow conduits 65 may include filters, flow regulators 74, sensors 76, or any combination thereof. The intake flow conduits 66 may extend laterally along a bottom portion of the diffuser 41, such as in a generally horizontal direction from the side wall 124 toward the TRF wall 53. For example, the intake flow conduits 66 may extend along the inner diffuser wall 44 directly from the sidewall 124 to a distal end 126 in close proximity to the TRF wall 53. In certain embodiments, the intake flow conduits 66 may extend at least 80, 85, 90, or 95 percent of a horizontal distance between the side wall 124 and the TRF wall 53. In this manner, the intake flow conduits 66 may help to focus the cooling flow directly onto the hot spot associated with the TRF wall 53, the bearings 51, and the TRF leakage 110. Inside the cavity 45, the coolant flows from the intake flow conduits 65 and/or 66 may flow along the turbine shaft and coupling assembly 14 and along the inner diffuser wall 44 before being discharged through the discharge flow conduit 68. In certain embodiments, the air supply system 60 (see FIG. 1) uses fans 61 to force the coolant flow (e.g., airflow) into the intake flow conduits 65 and/or 66, through the cavity 45, and out through the discharge flow conduit 68. However, in some embodiments, the rotational movement of the turbine shaft and coupling assembly 14 may help to force rotation of the coolant flow, thereby helping to force the coolant flow out through the discharge flow conduit 68. For example, the turbine shaft and coupling assembly 14 may include one or more flow inducing features 128 (e.g., protrusions, recesses, bolts, nuts, fins, impeller blades, etc.) spaced circumferentially about the axis 54, thereby helping to force the coolant flow to circulate throughout the cavity 45 and then flow out through the discharge flow conduit 68. Additionally, the cooling system 100 may also rely partially on the heat naturally rising upwardly through the discharge flow conduit 68 from the cavity 45. In the illustrated embodiment, the discharge flow conduit 68 includes a vertical conduit or stack.

As another example, the cooling system 102 is configured to push or pull a coolant flow (e.g., ventilation or cooling air) along a cooling flow path through one or more intake flow conduits 65 and/or 66 into the cavity 45 as indicated by arrows 116 and 118, through the cavity 45 to ventilate the cavity 45 and cool any hots spots (e.g., the turbine shaft coupling assembly 14 and TRF wall 53) as indicated by arrows 120, and out of the cavity 45 through one or more discharge flow conduits 70 as indicated by arrows 130. Similar to the cooling system 100, certain embodiments of the cooling system 102 may include only one or more intake flow conduits 65, only one or more intake flow conduits 66, or a combination of both of the intake flow conduits 65 and 66. The intake flow conduits 65 and 66 have the features described above with reference to the cooling system 100. Inside the cavity 45, the coolant flows from the intake flow conduits 65 and/or 66 may flow along the turbine shaft and coupling assembly 14 and along the inner diffuser wall 44 before being discharged through the discharge flow conduits 70. The coolant flows may be driven by the air supply system 60 and/or the rotational movement of the turbine shaft and coupling assembly 14 as described above with reference to the cooling system 100. Additionally, or alternatively, the coolant flows may be driven by (e.g., pulled or sucked by) the ventilation flow passing through the enclosure 2 as illustrated by arrows 31 in FIG. 1 (e.g., ventilation flow 31 through the chamber 27 from the ventilation air intake duct or stack 26 to the ventilation air exhaust duct or stack 28. In particular, the discharge flow conduits 70 may be fluidly coupled to the chamber 27 of the enclosure 2 as illustrated in FIG. 1. As illustrated in FIG. 2, each of the discharge flow conduits 70 include a first conduit portion 132 (e.g., a hollow support strut) extending between the inner and outer diffuser walls 44 and 46 of the diffuser 41, and a second conduit portion 134 extending between the outer diffuser wall 46 and the side wall 92 of the enclosure 3. The first and second conduit portions 132 and 134 are fluidly and structurally coupled together to define a discharge flow path from the cavity 45 inside the diffuser 41 to the chamber 27 inside the enclosure 2. Accordingly, the first and second conduit portions 132 and 134 are fluidly coupled together via an opening 136 in the outer diffuser wall 46, and the second conduit portion 134 is configured to fluidly couple to the chamber 27 inside the enclosure 2 via an opening 138 in the sidewall 92 and an opening 140 in the sidewall 90. The ventilation flow 31 inside the enclosure 2 helps to draw in (e.g., negative pressure or suction to pull in) the coolant flow passing through the discharge flow conduits 70. In certain embodiments, the cooling system 102 may use the suction to pull the coolant flow through the conduits 65 and/or 66, the cavity 45, and the conduits 70 without requiring any additional fans (e.g., fans 61 of the air supply system 60).

As another example, the cooling system 104 is configured to push or pull a coolant flow (e.g., ventilation or cooling air)

along a cooling flow path through one or more intake flow conduits 65 and/or 66 into the cavity 45 as indicated by arrows 116 and 118, through the cavity 45 to ventilate the cavity 45 and cool any hots spots (e.g., the turbine shaft coupling assembly 14 and TRF wall 53) as indicated by arrows 120, and out of the cavity 45 through one or more discharge flow conduits 72 as indicated by arrows 142. Similar to the cooling systems 100 and 102, certain embodiments of the cooling system 104 may include only one or more intake flow conduits 65, only one or more intake flow conduits 66, or a combination of both of the intake flow conduits 65 and 66. The intake flow conduits 65 and 66 have the features described above with reference to the cooling system 100. Inside the cavity 45, the coolant flows from the intake flow conduits 65 and/or 66 may flow along the turbine shaft and coupling assembly 14 and along the inner diffuser wall 44 before being discharged through the discharge flow conduits 72. The coolant flows may be driven by the air supply system 60 and/or the rotational movement of the turbine shaft and coupling assembly 14 as described above with reference to the cooling system 100. Additionally, or alternatively, the coolant flows may be driven by (e.g., pulled or sucked by) the exhaust flow passing through diffuser 41 along the exhaust flow path 40 between the inner and outer diffuser walls 44 and 46 As discussed in further detail below with reference to FIGS. 3-6, the discharge flow conduits 72 fluidly couple the cavity 45 with the exhaust flow path 40 via one or more openings 144 through the inner diffuser wall 44. The exhaust flow along the exhaust flow path 40 helps to draw in (e.g., negative pressure or suction to pull in) the coolant flow passing through the discharge flow conduits 72. The discharge flow conduits 72, by using suction to induce flow, may be described as eductors. In certain embodiments, the cooling system 104 may use the suction to pull the coolant flow through the conduits 65 and/or 66, the cavity 45, and the conduits 72 without requiring any additional fans (e.g., fans 61 of the air supply system 60). The illustrated discharge flow conduits 72 define discharge flow paths that turn in a downstream direction of the exhaust flow passing along the exhaust flow path 40 (e.g., turning discharge flow conduits). The discharge flow conduits 72, by turning in the downstream direction, help to prevent backflow of the exhaust flow into the cavity 45. The discharge flow conduits 72, by turning in the downstream direction, may also increase or control the suction provided by the exhaust flow to pull the coolant flow out of the cavity 45 and into the exhaust flow path 40.

The foregoing cooling systems 100, 102, and 104 may be used independently or in any combination with one another. As discussed above with reference to FIG. 1, each of the conduits 65, 66, 68, 70, and 72 may include one or more flow regulators 74 and sensors 76 coupled to the controller 78. The controller 78 may monitor the conditions (e.g., temperature, pressure, flow rate, vibration, noise, etc.) in the cavity 45 and the various conduits 65, 66, 68, 70, and 72, and then make adjustments to the cooling systems 100, 102, and 104 via the flow regulators 74, the air supply system 60, the fans 29, or any combination thereof. The cooling systems 100, 102, and 104 are discussed in further detail below with reference to FIGS. 3-11.

Figure 3:
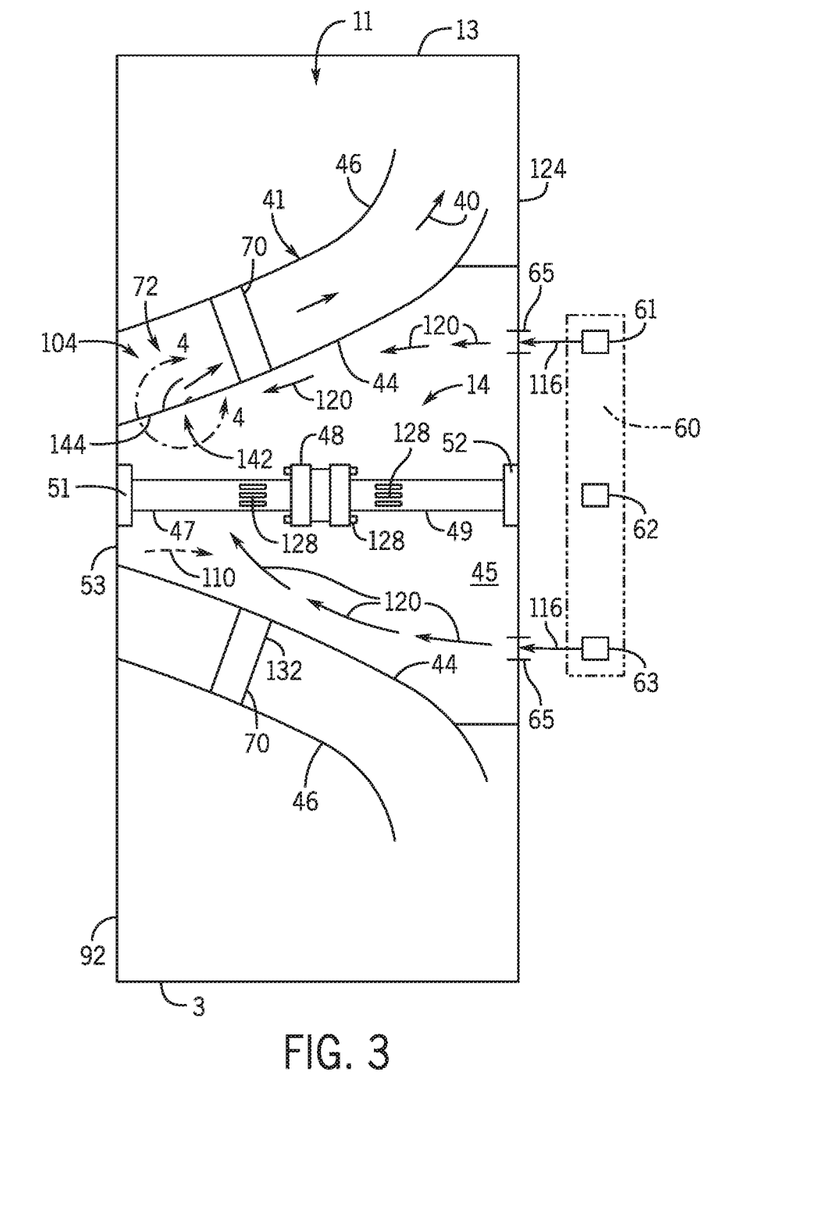
FIG. 3 is a schematic view of an embodiment of one of the cooling systems of FIG. 2, illustrating a discharge flow conduit (e.g., eductor) in an inner diffuser wall of a diffuser of the exhaust collector.

FIG. 3 is a schematic diagram of an embodiment of the cooling system 104 as illustrated in FIGS. 1 and 2. FIG. 3 illustrates the cooling system 104 without the cooling systems 100 and 102 and without the intake flow conduit 66. However, as noted above, the cooling system 104 may be used alone or in combination with the cooling systems 100 and 102, and the cooling system 104 may include the intake flow conduit 66 in combination with the intake flow conduits 65. In the illustrated embodiment, the cooling system 104 is substantially the same as described above with reference to FIGS. 1 and 2. As discussed above, the cooling system 104 is configured to push or pull a coolant flow (e.g., ventilation or cooling air) along a cooling flow path through one or more intake flow conduits 65 (and optionally also conduits 66) into the cavity 45 as indicated by arrows 116, through the cavity 45 to ventilate the cavity 45 and cool any hots spots (e.g., the turbine shaft coupling assembly 14 and TRF wall 53) as indicated by arrows 120, and out of the cavity 45 through one or more discharge flow conduits 72 as indicated by arrows 142. Inside the cavity 45, the coolant flows from the intake flow conduits 65 may flow along the turbine shaft and coupling assembly 14 and along the inner diffuser wall 44 before being discharged through the discharge flow conduits 72. The coolant flows may be driven by (e.g., pulled or sucked by) the exhaust flow passing through diffuser 41 along the exhaust flow path 40 between the inner and outer diffuser walls 44 and 46 Accordingly, the discharge flow conduits 72, by using suction to induce flow, may be described as eductors. In certain embodiments, the cooling system 104 may use the suction to pull the coolant flow through the conduits 65, the cavity 45, and the conduits 72 without requiring any additional fans (e.g., fans 61 of the air supply system 60). The illustrated discharge flow conduits 72 define discharge flow paths that turn in a downstream direction of the exhaust flow passing along the exhaust flow path 40 (e.g., turning discharge flow conduits). For simplicity of the drawing, the flow regulator 74 and the sensor 76 in the conduit 72 as described in FIGS. 1-2 are not shown in FIG. 3. Additional details of the discharge flow conduits 72 (e.g., eductors) are discussed below with reference to FIGS. 4-6.

Figure 4:
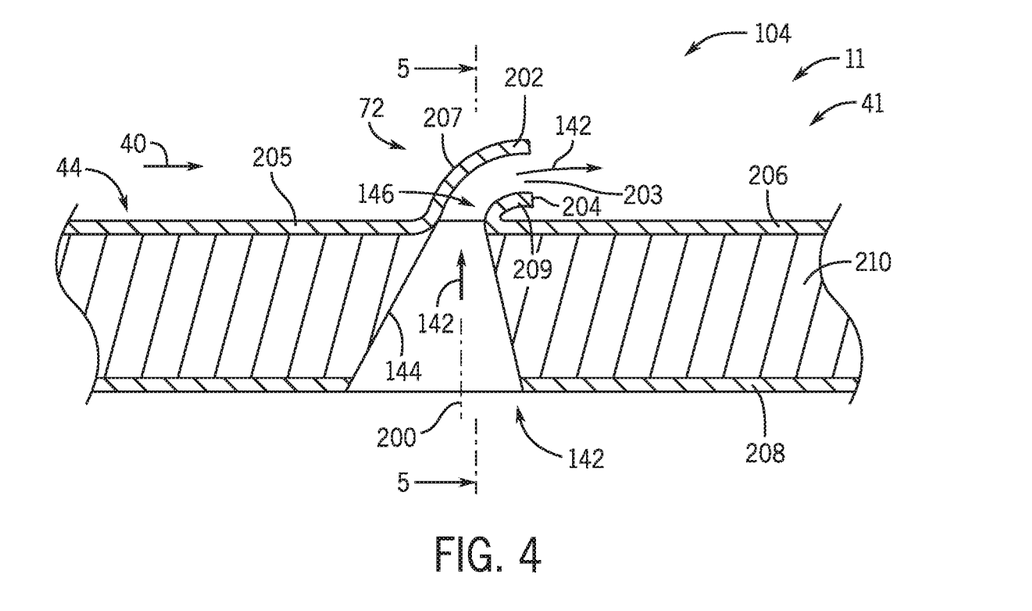
FIG. 4 is a partial cross-sectional view of the inner diffuser wall having the discharge flow conduit (e.g., eductor) taken within arcuate line 4-4 of FIG. 3, further illustrating details of the cooling system.

FIG. 4 is a partial cross-sectional view of the inner diffuser wall 44 having the discharge flow conduit 72 (e.g., eductor) taken within arcuate line 4-4 of FIG. 3, further illustrating details of the cooling system 104. The discharge flow conduit 72 (e.g., eductor) may include one or more openings 144 (e.g., circular, oval, square, or polygonal shaped openings) through the inner diffuser wall 44, and one or more baffles 202 and 204 coupled to the inner diffuser wall 44 and protruding into the exhaust flow path 40. The inner diffuser wall 44 includes an outer wall 206, an inner wall 208, and an insulation layer 210 disposed between the outer and inner walls 206 and 208. The insulation layer 210 helps to block or resist heat transfer through the inner diffuser wall 44 from the exhaust flow into the cavity 45. The openings 144 extend through the inner wall 208, the insulation layer 210, and the outer wall 206. The baffles 202 and 204 couple to the outer wall 206 of the inner diffuser wall 44.

The openings 144 extend along a central axis 200 through the inner diffuser wall 44, wherein the central axis 200 may be straight or curved, the central axis 200 may be oriented perpendicular to the inner diffuser wall 44, and/or the central axis 200 may be angled relative to the inner diffuser wall 44 (e.g., angled in a downstream direction relative to the exhaust flow path 40). The openings 144 also may have a cross-sectional area or width, which decreases or converges in a direction of the coolant flow 142 through the inner diffuser wall 44 (e.g., defining a converging flow path). In some embodiments, the cross-sectional area or width of the openings 144 may be at least partially uniform and/or decreasing (e.g., diverging) in the direction of the coolant flow 142 through the inner diffuser wall 44. However, the illustrated converging cross-sectional area of the openings 144 defines a throat 146, which may help to block reverse flow of the exhaust gas from the exhaust flow path 40 back into the cavity 45 inside of the diffuser 41.

The baffles 202 and 204 generally turn relative to the central axis 200 of the opening 144, and specifically turn in the downstream direction relative to the exhaust flow path 40. For example, the baffles 202 and 204 may turn approximately 90 degrees, turn until a discharge outlet 203 is substantially parallel with the exhaust flow path 40 (e.g., a centerline between inner and outer diffuser walls 44 and 46), or turn until the discharge outlet 203 is substantially parallel with a surface 205 of the inner diffuser wall 44. The baffles 202 and 204 may include turning portions 207 and 209, respectively, which may include curved turning portions, tapered or angled turning portions, or any combination thereof. For example, the turning portions 207 and 209 may include curved scoops (e.g., concave scoops), angled scoops, or any combination thereof. The baffles 202 and 204 may be equally spaced, converging, and/or diverging in the direction of the coolant flow 142 through the inner diffuser wall 44 and the discharge flow conduit 72. The downstream direction of the baffles 202 and 204 may help to block reverse flow of the exhaust gas from the exhaust flow path 40 back into the cavity 45 inside of the diffuser 41. Additionally, the baffle 204 is disposed downstream from the baffle 202, and the baffle 204 may help to catch any liquid or debris in the exhaust flow. For example, if any liquid or debris is disposed along the surface 205 of the inner diffuser wall 44, then the baffle 204 helps to block the liquid or debris 202 from entering the opening 144. The baffle 204 also may redirect the liquid or debris in a circumferential direction around the inner diffuser wall 44 (i.e., circumferentially around the axis 54 (see FIG. 1)), and then direct the liquid or debris to a drain 148 as shown in FIG. 1. For example, as illustrated in FIG. 1, a conduit or catch basin 150 may be disposed below the diffuser 41, so that any redirected liquid or debris flows into the drain 148.

Figure 5:
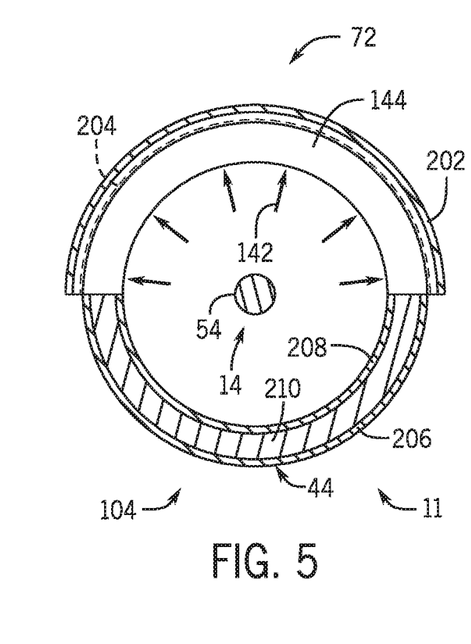
FIG. 5 is a cross-sectional view of the inner diffuser wall having the discharge flow conduit (e.g., eductor) taken along line 5-5 of FIG. 4, further illustrating details of the baffles and the corresponding opening (e.g., single continuous opening)

In certain embodiments, the cooling system 104 may include a plurality of sets of baffles 202 and 204, each associated with a corresponding opening 144. For example, FIG. 5 is a cross-sectional view of the inner diffuser wall 44 having the discharge flow conduit 72 (e.g., eductor) taken along line 5-5 of FIG. 4, further illustrating details of the baffles 202 and 204 and the corresponding opening 144. In the illustrated embodiment, the opening 144 (e.g., a single circumferentially elongated opening or semi-circular slot) through the inner diffuser wall 44 extends circumferentially about the axis 54, e.g., approximately 180 degrees about the axis 54. Likewise, the baffles 202 and 204 of the discharge flow conduit 72 are positioned on opposite sides (i.e., upstream and downstream) of the opening 144, and extend circumferentially about the axis 54, e.g., approximately 180 degrees about the axis 54. In certain embodiments, the opening 144 and the baffles 202 and 204 may extend at least 30, 45, 60, 75, 90, 120, 150, or 180 degrees about the axis 54. In some embodiments, the opening 144 may be continuous and uniform in the circumferential direction about the axis 54, or the opening 144 may be continuous but varying in geometry (e.g., width) in the circumferential direction about the axis 54.

Figure 6:
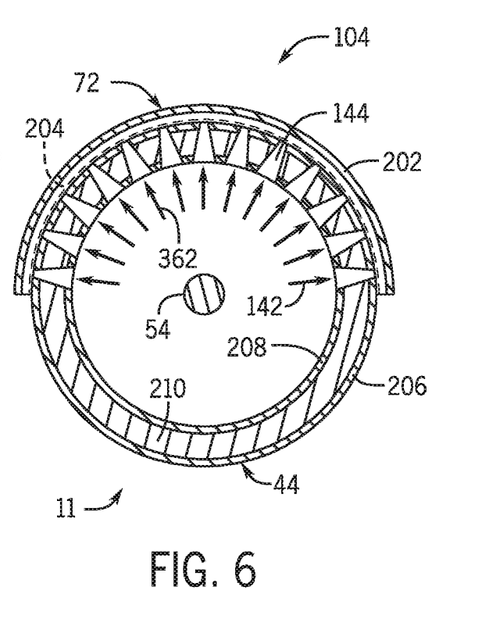
FIG. 6 is a cross-sectional view of the inner diffuser wall having the discharge flow conduit (e.g., eductor) taken along line 5-5 of FIG. 4, further illustrating details of the baffles and a plurality of discrete openings.

Alternatively or additionally, the cooling system 104 may include a plurality of discrete sets of openings 144 between the baffles 202 and 204. For example, FIG. 6 is a cross-sectional view of the inner diffuser wall 44 having the discharge flow conduit 72 (e.g., eductor) taken along line 5-5 of FIG. 4, further illustrating details of the baffles 202 and 204 and a plurality of discrete openings 144. In the illustrated embodiment, the openings 144 are circumferentially spaced apart from one another in a circumferential direction about the axis 54, and the openings 144 extend over a circumferential distance of approximately 180 degrees about the axis 54. In certain embodiments, the opening 144 and the baffles 202 and 204 may extend over a circumferential distance of at least 30, 45, 60, 75, 90, 120, 150, or 180 degrees about the axis 54. Each of the illustrated openings 144 converges from the inner wall 208 to the outer wall 206 of the inner diffuser wall 44, the openings 144 have the same geometry, the openings 144 are equally spaced apart from one another. In some embodiments, the openings 144 may have converging, diverging, and/or uniform flow paths from the inner wall 208 to the outer wall 206 of the inner diffuser wall 44. The openings 144 may have different geometries, such as different converging geometries (e.g., converging geometries with different angles of convergence, different cross-sectional areas, etc.), different diverging geometries, different uniform geometries, or a combination of types of geometries (e.g., converging, diverging, and/or uniform geometries). In the illustrated embodiment, one set of the baffles 202 and 204 extends along all of the openings 144. In some embodiments, a pair of baffles 202 and 204 may be dedicated to each one of the openings 144, or a pair of baffles 202 and 204 may be dedicated to two or more of the openings 144 (but less than the entire number of openings 144 in the inner diffuser wall 44).

Figure 7:
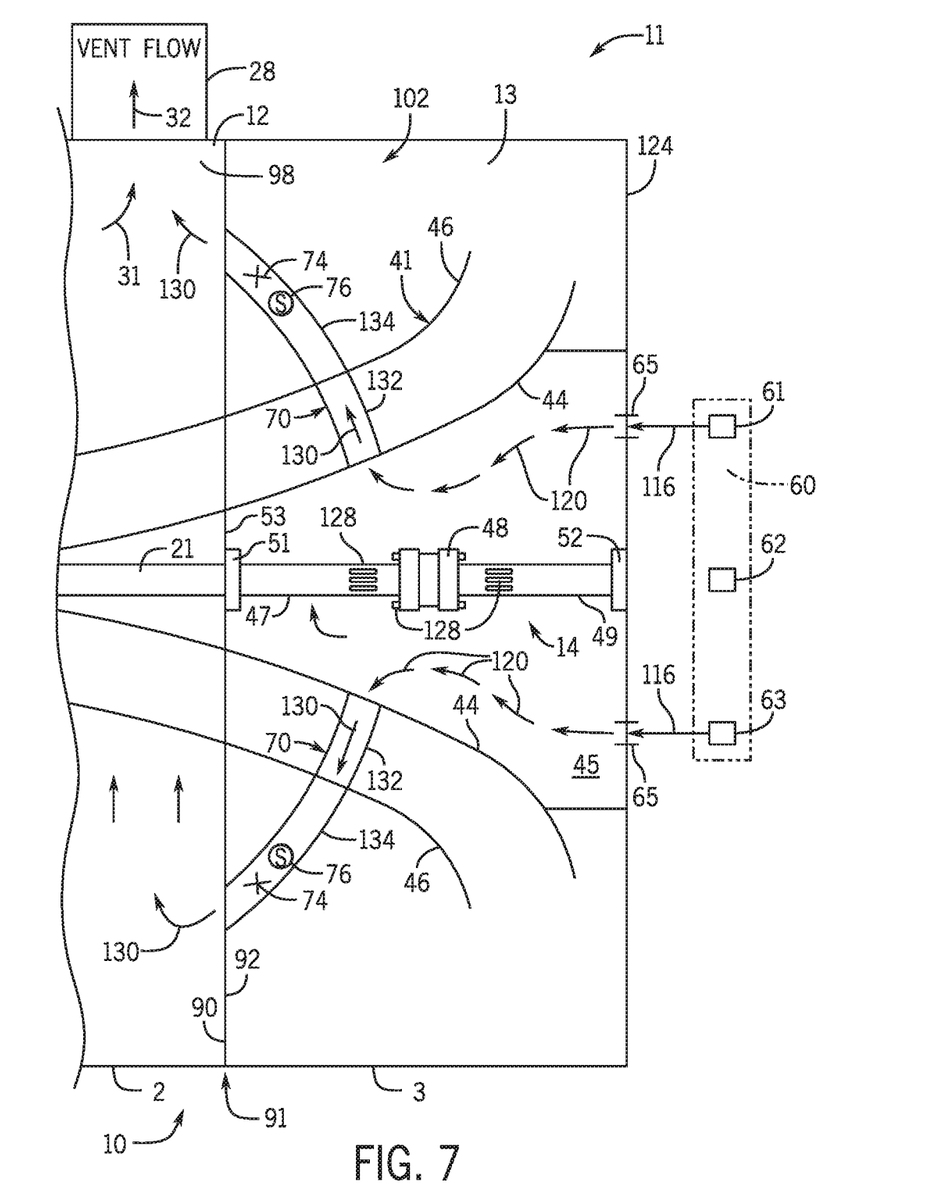
FIG. 7 is a schematic of an embodiment of a cooling system as illustrated in FIGS. 1 and 2.

FIG. 7 is a schematic of an embodiment of the cooling system 102 as illustrated in FIGS. 1 and 2. FIG. 7 illustrates the cooling system 102 without the cooling systems 100 and 104 and without the intake flow conduit 66. However, as noted above, the cooling system 102 may be used alone or in combination with the cooling systems 100 and 104, and the cooling system 102 may include the intake flow conduit 66 in combination with the intake flow conduits 65. In the illustrated embodiment, the cooling system 102 is substantially the same as described above with reference to FIGS. 1 and 2. As discussed above, the cooling system 102 is configured to push or pull a coolant flow (e.g., ventilation or cooling air) along a cooling flow path through one or more intake flow conduits 65 (and optionally also conduits 66) into the cavity 45 as indicated by arrows 116, through the cavity 45 to ventilate the cavity 45 and cool any hots spots (e.g., the turbine shaft coupling assembly 14 and TRF wall 53) as indicated by arrows 120, out of the cavity 45 through one or more discharge flow conduits 70 as indicated by arrows 130, and then out through the ventilation air exhaust duct or stack 28 coupled to the enclosure 2. Inside the cavity 45, the coolant flows from the intake flow conduits 65 may flow along the turbine shaft and coupling assembly 14 and along the inner diffuser wall 44 before being discharged through the discharge flow conduits 70. The discharge flow conduits 70 are fluidly coupled to the chamber 27 inside the enclosure 2, where a ventilation flow 31 passes through the enclosure 2 from the ventilation air intake duct or stack 26 to the ventilation air exhaust duct or stack 28 to help ventilate the gas turbine engine 12. This ventilation flow 31 provides a motive force or negative pressure to draw in the coolant flows from the discharge flow conduits 70. Accordingly, the coolant flows may be driven by (e.g., pulled or sucked by) the ventilation flow 31 passing through the enclosure 2, thereby pulling the coolant flows into the chamber 27 and out through the ventilation air exhaust duct or stack 28. For these reasons, the discharge flow conduits 70 may be described as eductors. In certain embodiments, the cooling system 102 may use the suction to pull the coolant flow through the conduits 65, the cavity 45, and the conduits 70 without requiring any additional fans (e.g., fans 61 of the air supply system 60). Additional details of the discharge flow conduits 70 (e.g., eductors) are discussed below with reference to FIG. 8.

Figure 8:
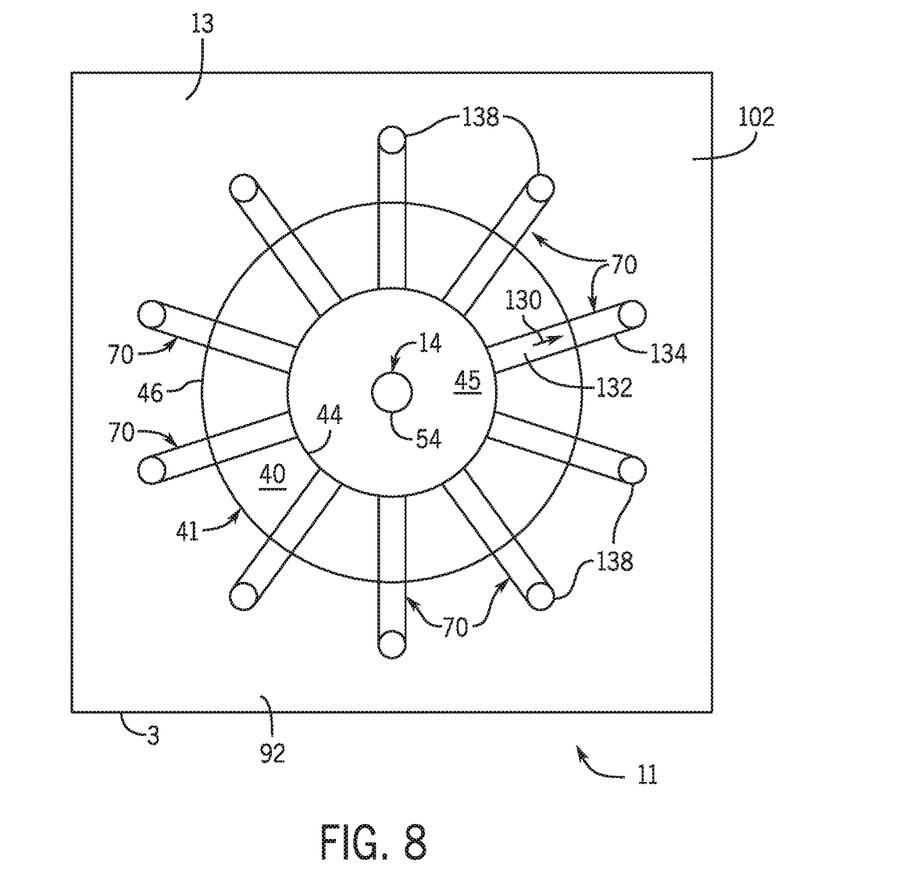
FIG. 8 is a schematic cross-sectional view of an embodiment of the cooling system of FIG. 7, illustrating an arrangement of discharge flow conduits spaced circumferentially about the axis of the diffuser.

FIG. 8 is a schematic cross-sectional view of an embodiment of the cooling system 102 of FIG. 7, illustrating an arrangement of discharge flow conduits 70 (e.g., radial conduits) spaced circumferentially about the axis 54 of the diffuser 41. The discharge flow conduits 70 may have a variety of shapes and sizes, such as cylindrical shaped conduits, conduits having an airfoil shaped cross-section, conduits having an oval shaped cross-section, etc. As discussed above, each of the discharge flow conduits 70 include a first conduit portion 132 (e.g., a hollow support strut or radial strut) extending between the inner and outer diffuser walls 44 and 46 of the diffuser 41, and a second conduit portion 134 extending between the outer diffuser wall 46 and the side wall 92 of the enclosure 3. Each of the discharge flow conduits 70 has the first conduit portion 132 fluidly coupled with the cavity 45 inside of the inner diffuser wall 44 and the second conduit portion 134 fluidly coupled with the chamber 27 inside of the enclosure 2 housing the gas turbine engine 12. In particular, the second conduit portions 134 couple with openings 138 in the sidewall 92 of the enclosure 3, which in turn fluidly couple with openings 140 in the sidewall 90 of the enclosure 2. In the illustrated embodiment, the discharge flow conduits 70 are equally spaced in the circumferential direction about the axis 54, and each of the discharge flow conduits 70 has the same geometry. In some embodiments, the discharge flow conduits 70 may be non-uniformly spaced in the circumferential direction about the axis 54, and/or the geometry of the discharge flow conduits 70 may vary from one conduit to another. For example, the discharge flow conduits 70 may be more closely spaced or focused in areas having hot spots, the discharge flow conduits 70 may have larger cross-sectional areas in areas having hot spots, or a combination thereof. Although FIG. 8 illustrates a particular number of the discharge flow conduits 70, embodiments of the cooling system 102 may have any number of the discharge flow conduits 70 (e.g., 1, 2, 3, 4, 5, 6, 7, 8, 9, 10, 15, 20, or more).

Figure 9:
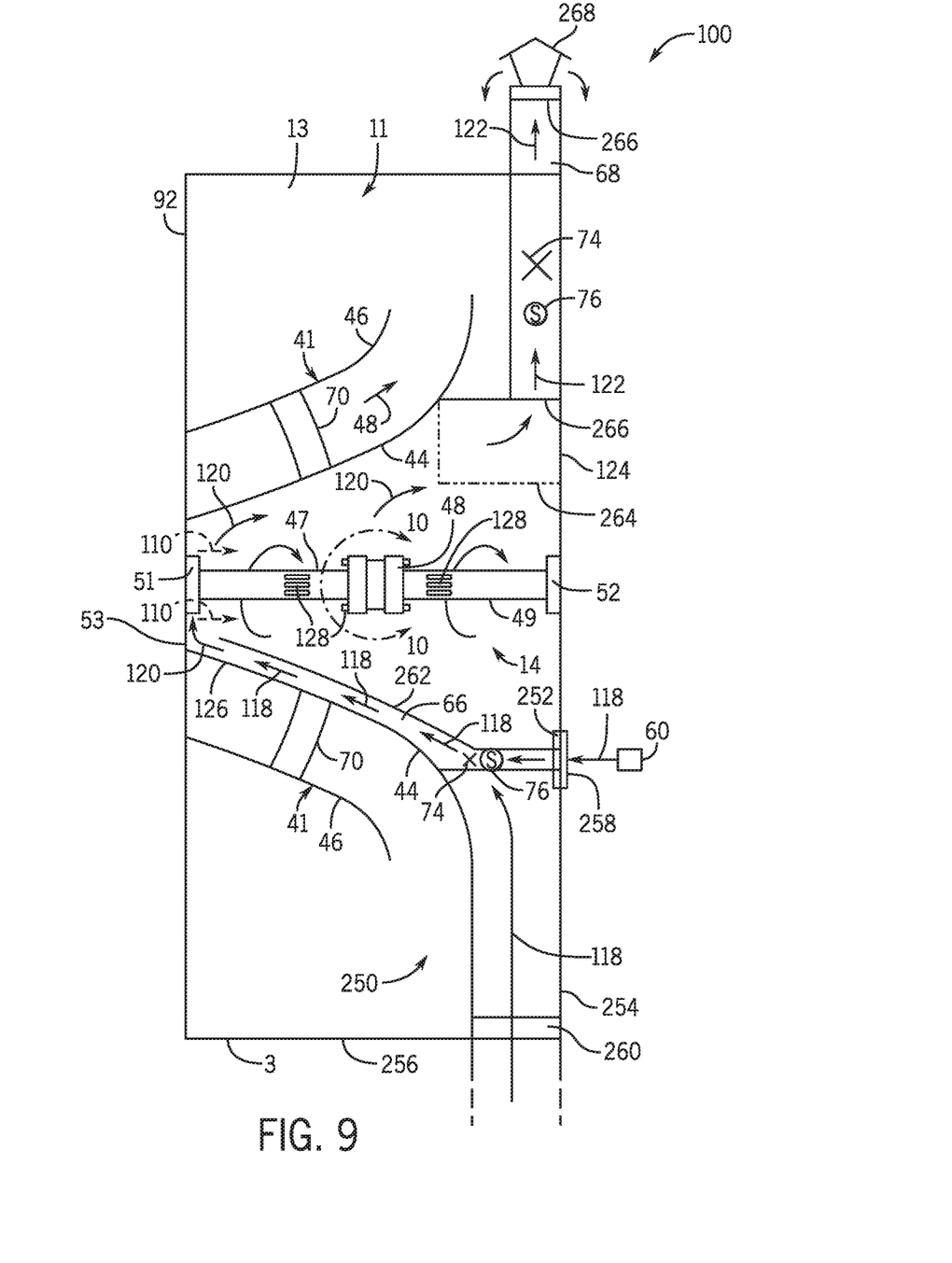
FIG. 9 is a schematic of an embodiment of a cooling system as illustrated in FIGS. 1 and 2.

FIG. 9 is a schematic of an embodiment of the cooling system 100 as illustrated in FIGS. 1 and 2. FIG. 9 illustrates the cooling system 100 without the cooling systems 102 and 104 and without the intake flow conduits 65. However, as noted above, the cooling system 100 may be used alone or in combination with the cooling systems 102 and 104, and the cooling system 100 may include the intake flow conduits 65 in combination with the intake flow conduit 66. In the illustrated embodiment, the cooling system 100 is substantially the same as described above with reference to FIGS. 1 and 2. As discussed above, the cooling system 100 is configured to push or pull a coolant flow (e.g., ventilation or cooling air) along a cooling flow path through one or more intake flow conduits 66 (and optionally also conduits 65) into the cavity 45 as indicated by arrows 118, through the cavity 45 to ventilate the cavity 45 and cool any hots spots (e.g., the turbine shaft coupling assembly 14 and TRF wall 53) as indicated by arrows 120, and then out of the cavity 45 through one or more discharge flow conduits 68 as indicated by arrows 122.

The intake flow conduit 66 may include a plurality of intake sections 250, such as an intake section 252 coupled to the sidewall 124 and an intake section 254 extending upwardly from a bottom wall 256 of the enclosure 3. The intake sections 250 (e.g., 252 and 254) may include one or more openings, conduits, and/or baffles, which are configured to direct a coolant flow into the intake flow conduit 66.

The intake sections 250 also may include air treatment units, such as an air treatment unit 258 in the intake section 252 and an air treatment unit 260 in the intake section 254. The air treatment units 258 and 260 may include screens, filters, or any combination thereof. The illustrated intake flow conduit 66 extends along a bottom portion of the diffuser 41, e.g., along the inner diffuser wall 44, and may include a walkway or user access platform 262. The intake flow conduit 66 extends toward a hot spot associated with the TRF leakage 110 at the TRF wall 53 and the bearings 51. The distal end 126 of the intake flow conduit 66 is disposed in close proximately to the TRF leakage 110, the TRF wall 53, and/or the bearings 51, thereby helping to focus the coolant flow on the hot spot. In certain embodiments, one of the intake flow conduits 66 may extend to each hot spot in the cavity 45. Therefore, after exiting the intake flow conduit 66, the coolant flow initially contacts the hot spot and then circulates throughout the cavity 45.

Inside the cavity 45, the coolant flow from the intake flow conduit 66 may flow along the turbine shaft and coupling assembly 14 and along the inner diffuser wall 44 before being discharged through the discharge flow conduit 68. In certain embodiments, the rotational movement of the turbine shaft and coupling assembly 14 may help to force rotation of the coolant flow, thereby helping to force the coolant flow out through the discharge flow conduit 68. Accordingly, as discussed above, one or more flow inducing features 128 (e.g., protrusions, recesses, bolts, nuts, fins, impeller blades, etc.) on the turbine shaft and coupling assembly 14 help to drive the coolant flow as the features 128 rotate with the assembly 14. However, the cooling system 100 may also rely partially on the heat naturally rising upwardly through the discharge flow conduit 68, the fans 61 of the air supply system 60, or any combination thereof. The cooling system 100 also may include features to control the discharge of the coolant flow through the discharge flow conduit 68. For example, a diverter plate 264 (e.g., one or more baffles or walls) may be disposed inside the cavity 45 adjacent an inlet 266 of the discharge flow conduit 68. The diverter plate 264 is configured to divert (e.g., redirect) at least a portion of the coolant flow inside the cavity 45, such that the coolant flow exits through the discharge flow conduit 68. The discharge flow conduit 68 also may include one or more treatment units 266 (e.g., screens, filters, sound absorption sections, etc.) and a cap 268, which may be configured to disperse the coolant flow. Additional details of the flow inducing features 128 and the diverter plate 264 are discussed below with reference to FIGS. 9 and 10.

Figure 10:
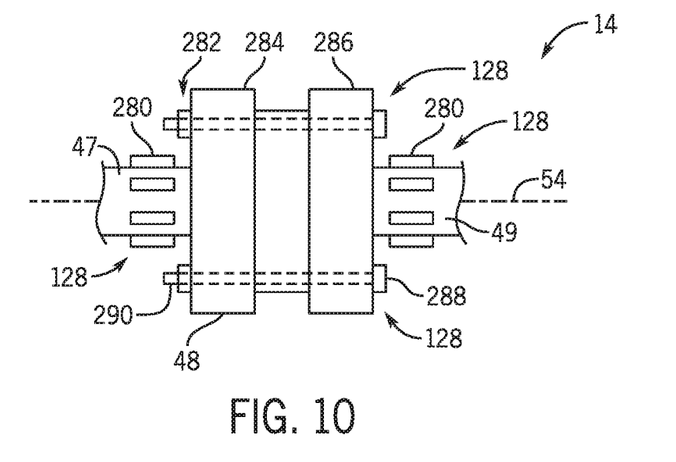
FIG. 10 is a partial side view of the turbine shaft and coupling assembly taken within line 10-10 of FIG. 9, further illustrating details of various flow inducing features.

FIG. 10 is a partial side view of the turbine shaft and coupling assembly 14 taken within line 10-10 of FIG. 9, further illustrating details of various flow inducing features 128 disposed on the shaft 47, the coupling 48, and the shaft 49. In certain embodiment, the flow inducing features 128 disposed on the shafts 47 and 49 may include radial protrusions 280 (e.g., fins, impeller blades, or rectangular plates) spaced circumferentially about the axis 54. Additionally or alternatively, the flow inducing features 128 disposed on the coupling 48 may include fasteners 282 (e.g., threaded fasteners) spaced circumferentially about the axis 54. The fasteners 282 may couple together the shafts 47 and 49 at respective flanges 284 and 286. Each of the fasteners 282 may extend axially through the flanges 284 and 286 and compress the flanges 284 and 286 toward one another. For example, each of the fasteners 282 may include a threaded bolt 288 and a threaded nut 290. In certain embodiments, as the turbine shaft and coupling assembly 14 rotates during operation of the gas turbine engine 12, the fasteners 282 may provide sufficient motive force to drive the coolant flow out through the discharge flow conduit 68 with or without the radial protrusions 280.

Figure 11:
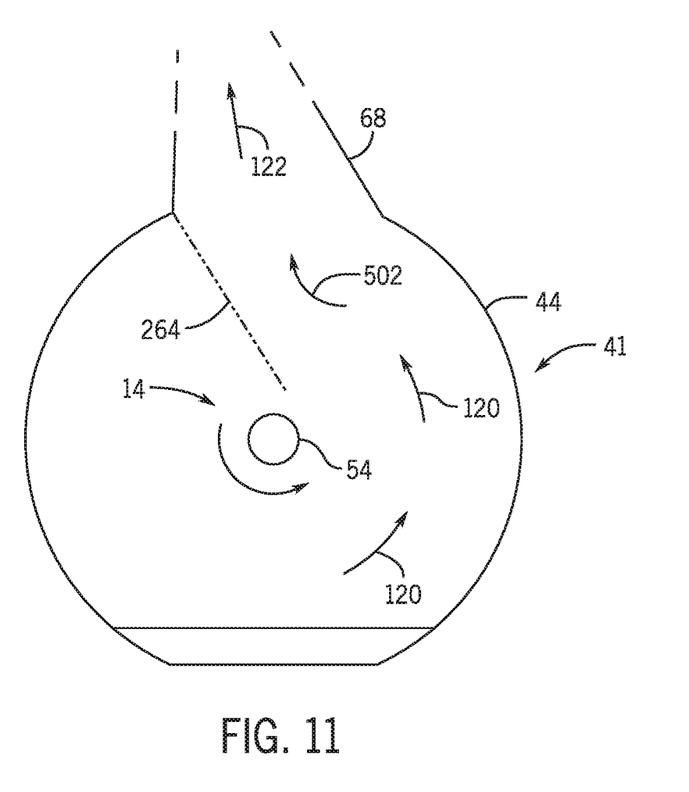
FIG. 11 is a partial side view of a diverter plate adjacent an inlet of a discharge flow conduit of FIG. 9, further illustrating details of the diverter plate.

FIG. 11 is a partial side view of the diverter plate 264 adjacent the inlet 266 of the discharge flow conduit 68 of FIG. 9, further illustrating details of the diverter plate 264. As illustrated, the diverter plate 264 protrudes inwardly from the inner diffuser wall 44 toward the turbine shaft and coupling assembly 14 (i.e., in an inward radial direction relative to the axis 54). For example, the diverter plate 264 may extend a radial distance of at least 10, 20, 30, 40, 50, 60, 70, or 80 percent of a total radial distance between the inner diffuser wall 44 and the turbine shaft and coupling assembly 14. The diverter plate 264 is configured to catch the coolant flow indicated by arrows 120, and then redirect the coolant flow into the discharge flow conduit 68.

Technical effects of the invention include the one or more cooling systems 11 (e.g., 100, 102, and/or 104) configured to ventilate the enclosure 3 having the exhaust collector 13. Sources of heat stem from turbine rear frame (TRF) leakage, exhaust heat, and heat from the shaft 21 coupled to the turbine shaft and coupling assembly 14 within the gas turbine system 10. Embodiments of the present disclosure provide a system that includes one or more cooling systems 11 disposed within the gas turbine system. In certain embodiments, the cooling system 104 includes the discharge flow conduit 72 (e.g., educator) disposed on an inner diffuser wall 44 in the turbine exhaust collector 13, such that the exhaust flow along the exhaust flow path 40 sucks the coolant flow from the cavity 45 surrounding the turbine shaft and coupling assembly 14 based on the high velocity of combustion exhaust. In certain embodiments, the cooling system 102 may include the one or more discharge flow conduits 70, which include the first conduit portion 132 (e.g., a hollow support strut) extending between the inner and outer diffuser walls 44 and 46 of the diffuser 41, and the second conduit portion 134 extending between the outer diffuser wall 46 and the side wall 92 of the enclosure 3. The ventilation flow 31 inside of the enclosure 2 sucks in the coolant flow from the cavity 45 through the discharge flow conduits 70, and then discharges the coolant flow with the ventilation flow through the ventilation air exhaust duct or stack 28. In certain embodiments, the cooling system 100 intakes the coolant flow through the intake flow duct 66 (e.g., along the walkway or user access platform 262), thereby directing the coolant flow against the hot spot (e.g., TRF leakage 110). The cooling system 100 also may use the rotation of the turbine shaft and coupling assembly 14 to help drive the coolant flow out of the cavity 45 through the discharge flow conduit 68. These cooling systems 100, 102, and 104 may be used independently or in any combination with one another to ventilate the cavity 45 and cool the turbine shaft and coupling assembly 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a turbine exhaust collector, comprising:
a first enclosure having an exhaust inlet and an exhaust outlet, wherein the exhaust inlet is configured to receive an exhaust gas from a gas turbine;
a diffuser coupled to the exhaust inlet, wherein the diffuser comprises an inner diffuser wall disposed about a cavity, an outer diffuser wall disposed about the inner diffuser wall, and an exhaust flow path between the inner diffuser wall and the outer diffuser wall, wherein the cavity is configured to extend from an exterior surface of a rotary shaft to an interior surface of the inner diffuser wall; and
a first cooling flow path having a first portion and a second portion, the second portion receiving a first cooling flow from the first portion,
wherein the first portion of the first cooling flow path comprises a duct extending through the cavity along the inner diffuser wall toward a turbine rear frame, wherein the rotary shaft is configured to couple to a turbine shaft extending through a bore in the turbine rear frame, wherein the first portion of the first cooling flow path is configured to guide the first cooling flow toward the turbine rear frame, and a leak flow between the turbine shaft and the turbine rear frame is configured to provide a suction to draw in the first cooling flow through the duct,
wherein the second portion of the first cooling flow path comprises the cavity extending from the exterior surface of the rotary shaft to the interior surface of the inner diffuser wall, wherein the first cooling flow through the second portion of the first cooling flow path extends along the exterior surface and the interior surface.

2. The system of claim 1, wherein the first enclosure does not surround the gas turbine, and the first enclosure is separate from a second enclosure surrounding the gas turbine, wherein the second enclosure comprises a room having a chamber disposed about the gas turbine.

3. The system of claim 2, comprising the second enclosure, wherein the gas turbine comprises a turbine section having one or more turbine stages, a combustor section having one or more combustors upstream from the turbine section, and a compressor section having one or more compressor stages upstream from the combustor section, wherein the second enclosure comprises a ventilation intake, a ventilation exhaust, and a second cooling flow path through the chamber from the ventilation intake to the ventilation exhaust, wherein the second cooling flow path does not extend internally through the gas turbine.

4. The system of claim 3, comprising a ventilation system coupled to the second cooling flow path through the second enclosure, wherein the ventilation system comprises one or more fans.

5. The system of claim 4, wherein the first cooling flow path is coupled to the second cooling flow path, wherein a second cooling flow through the second cooling flow path is configured to provide another suction to draw in the first cooling flow from the first cooling flow path.

6. The system of claim 3, wherein the first cooling flow through the first cooling flow path is pushed or pulled into a second cooling flow along the second cooling flow path through the second enclosure.

7. The system of claim 2, wherein the first cooling flow path extends through the cavity and at least one hollow strut extending between the inner diffuser wall and the outer diffuser wall.

8. The system of claim 7, wherein the first cooling flow path extends from the at least one hollow strut through a conduit configured to couple to a second cooling flow path through the second enclosure.

9. The system of claim 1, wherein the first cooling flow path extends through at least one passage through the inner diffuser wall in a direction outwardly away from the cavity and into the exhaust flow path between the inner and outer diffuser walls of the diffuser.

10. The system of claim 9, wherein the at least one passage has a cross-sectional area that decreases through the inner diffuser wall in the direction outwardly away from the cavity and into the exhaust flow path between the inner and outer diffuser walls of the diffuser.

11. The system of claim 9, wherein the at least one passage comprises a slot extending in a circumferential direction at least partially about a circumference of the inner diffuser wall.

12. The system of claim 9, wherein the at least one passage comprises a plurality of passages spaced in a circumferential direction at least partially about a circumference of the inner diffuser wall.

13. The system of claim 9, wherein an exhaust flow through the exhaust flow path is configured to provide another suction to draw in the first cooling flow from the at least one passage of the first cooling flow path.

14. The system of claim 9, comprising a first baffle coupled to the inner diffuser wall upstream of the at least one passage, wherein the first baffle turns in a downstream direction of the exhaust flow path.

15. The system of claim 14, comprising a second baffle coupled to the inner diffuser wall downstream of the at least one passage and the first baffle, wherein the second baffle extends over a wall portion of the inner diffuser wall, and the second baffle is configured to catch liquid or debris.

16. The system of claim 1, wherein a rotation of the rotary shaft is configured to drive the first cooling flow along the second portion of the first cooling flow path through the cavity.

17. A system, comprising:
a turbine exhaust collector, comprising:
   a diffuser comprising an inner diffuser wall disposed about a cavity, an outer diffuser wall disposed about the inner diffuser wall, and an exhaust flow path between the inner diffuser wall and the outer diffuser wall, wherein the cavity is configured to extend from an exterior surface of a rotary shaft to an interior surface of the inner diffuser wall; and
   a first cooling flow path having a first portion and a second portion, the second portion receiving a first cooling flow from the first portion,
   wherein the first portion of the first cooling flow path comprises a duct extending through the cavity along the inner diffuser wall toward a turbine rear frame, wherein the rotary shaft is configured to couple to a turbine shaft extending through a bore in the turbine rear frame, wherein the first portion of the first cooling flow path is configured to guide the first cooling flow toward the turbine rear frame, and a leak flow between the turbine shaft and the turbine rear frame is configured to provide a suction to draw in the first cooling flow through the duct,
   wherein the second portion of the first cooling flow path comprises the cavity extending from the exterior surface of the rotary shaft to the interior surface of the inner diffuser wall, wherein the first cooling flow through the second portion of the first cooling flow path extends along the exterior surface and the interior surface.

18. A system, comprising:
a turbine exhaust collector, comprising:
   a diffuser comprising an inner diffuser wall disposed about a cavity, an outer diffuser wall disposed about the inner diffuser wall, and an exhaust flow path between the inner diffuser wall and the outer diffuser wall, wherein the cavity is configured to extend from an exterior surface of a rotary shaft to an interior surface of the inner diffuser wall; and
   a first cooling flow path having a first portion and a second portion, the second portion receiving a first cooling flow from the first portion,
   wherein the first portion of the first cooling flow path comprises a duct extending through the cavity along the inner diffuser wall toward a turbine rear frame, wherein the rotary shaft is configured to couple to a turbine shaft extending through a bore in the turbine rear frame, wherein the first portion of the first cooling flow path is configured to guide the first cooling flow toward the turbine rear frame, and a leak flow between the turbine shaft and the turbine rear frame is configured to provide a suction to draw in the first cooling flow through the duct,
   wherein the second portion of the first cooling flow path comprises the cavity extending from the exterior surface of the rotary shaft to the interior surface of the inner diffuser wall, wherein the first cooling flow through the second portion of the first cooling flow path extends along the exterior surface and the interior surface,
   wherein a rotation of the rotary shaft is configured to drive the first cooling flow along the second portion of the first cooling flow path.

* * * * *